United States Patent Office 3,730,879
Patented May 1, 1973

3,730,879
TWO-BED CATALYST ARRANGEMENT FOR HYDRODESULFURIZATION OF CRUDE OIL
Robert D. Christman, Pittsburgh, George E. Elliott, Oakmont, and Guglielmo Guelfi, Pittsburgh, Pa., assignors to Gulf Research & Development Company, Pittsburgh, Pa.
Filed Nov. 19, 1970, Ser. No. 90,964
Int. Cl. C10g 23/02
U.S. Cl. 208—210                    7 Claims

ABSTRACT OF THE DISCLOSURE

A two-bed hydrodesulfurization of crude oil or reduced crude oil containing the asphaltene fraction of the crude is carried out with catalytic particles of a Group VI and Group VIII metal supported on a non-cracking alumina. In the first bed at least 50% of the total pore volume of said catalyst has pores with radii in the 50–100 angstrom range; in the second bed less than 45% of the total pore volume of said catalyst has pores with radii in the 50–100 angstrom range. The higher percentage of pores in the first bed provides increased sulfur selectivity while the lesser percentage of pores in the second bed provides enhanced aging characteristic for the combined catalyst beds.

DESCRIPTION OF THE INVENTION

The present invention relates to a method involving the use of a selective catalyst arrangement for desulfurization of crude oil or petroleum residuals, and more particularly to catalyst means of the character described having a predetermined range of pore diameters with enhanced selectivity for the desulfurization reaction. In those applications where catalyst aging is an essential characteristic the invention contemplates a multi-layered arrangement of catalysts having respectively differing predetermined pore distributions.

Owing to their potential for air pollution, residual petroleum oil, containing relatively high proportions of sulfur, as well as high sulfur crude oils, are relatively less desirable as fuels and for other applications than corresponding oils of low sulfur content.

The invention is particularly directed to a catalyst of the character described in which the predetermined pore distribution enhances the selectivity of the catalyst for desulfurization, effectively limiting the deposition of metallic components, which can cause filtering action, increased pressure drop, and eventual complete encrustation of the top layer of the catalyst. The metallic components, also can deactivate the catalyst. For certain applications, a catalyst of the character described, having a predetermined range of pore diameters can be used to advantage for desulfurization purposes without an attendant usage of other features of the invention. However, in a preferred form of the invention a catalyst configuration includes one or more layers of catalyst having a predetermined pore size distribution which is more selective to the desulfurization process but also more susceptible to aging, and one or more layers of a catalyst having a differing pore size distribution which is less selective for the desulfurization process but less sensitive to aging.

A variety of hydrodesulfurization processes have been proposed from time to time for reduction of relatively high sulfur contents of certain crude oils or of residual petroleum fractions. Difficulty has been experienced, however, in achieving an acceptable catalytic hydrodesulfurization process owing to lack of selectivity of the catalyst for contact desulfurization and to poor aging characteristics of the catalyst. Short catalyst life is manifested by inability of a catalyst to maintain an acceptable capability for desulfurizing, owing to the absorption of metallic contaminants which either deactivate the catalyst or cause the top of the catalyst bed to become a filter. In the latter situation, the absorption of metallic contaminants, particularly in the case of catalysts of small particle size, causes the catalyst particles to be cemented together and the voids therebetween to become considerably reduced. This occurs primarily in the front one percent, i.e. in a thin upstream layer, of the catalyst bed which ultimately becomes a filter for the solid materials usually contained in crude oils and residual fractions. The resulting encrustation adjacent the upstream surface of the catalyst bed increases the pressure drop across the catalyst bed rather drastically whereupon the process must be shutdown for changing of the catalyst.

The hydrodesulfurization of a reduced crude is particularly difficult because the feed not only contains a considerable amount of solids, but also contains nearly all of the metal contaminants of the crude, particularly nickel and vanadium, which deactivate the catalyst and increase pressure drop as noted above. An important feature of the invention is the fact that removal of the metal contaminants is inhibited by selection of a catalyst having a predetermined distribution of pore diameters.

A catalyst with both a selective pore size distribution and a given particle size offers further advantageous operating charcateristics. In those applications requiring a catalyst of the character described, which is more susceptible to aging, a composite catalyst bed is employed. An upper or upstream layer of a compact catalyst bed is comprised of catalyst of the aforementioned pore size distribution to minimize buildup of absorbed metallic contaminants, and to delay encrustation on the upstream side of the catalyst bed. A succeeding layer of the catalyst bed, i.e. downstream of or below the first-mentioned layer, is provided with a differing pore size distribution such that the catalyst is less susceptible to aging, although it is also more selective for removal of metal contaminants from the oil. The metal contaminants, therefore, are divided between the catalyst layers, such that the rate of filtration and encrustation is significantly reduced. The catalytic ability of the bed then is limited to an unimpaired, useful life of the catalyst rather than to an aging limit imposed by the tendencies to encrustation and increasing pressure drops across the catalyst bed. With our invention, therefore, the terminal encrustation of the catalyst bed is postponed beyond the useful life span imposed by the normal aging characteristic of the catalyst bed, as represented by the longer lived layer thereof.

These results are accomplished in the first instance by the provision of a catalyst of the Groups VI and VIII variety, as the active metals combination for the catalyst of the invention. Various combinations can be utilized such as cobalt-molybdenum, nickel-tungsten, nickel-molybdenum and nickel-cobalt-molybdenum. Alumina is the preferred supporting material but other non-cracking supports can also be used. In general, a supported Group VI and Group VIII metal hydrodesulfurization catalyst having an exceptionally small particle size is preferred. Substantially all or a major proportion of the catalyst particles should have a diameter between about 1/20 and 1/40 inch.

A preferred catalyst pore distribution which we have found to be particularly useful with the aforementioned small particle size and which exhibits an unexpected selectivity for desulfurization in this connection, we have discovered is a suitable Group VI and Group VII catalyst having no more than about 30 percent of its total pore volume falling within the 100–300 angstrom radius range to enhance selectivity for sulfur removal in comparison to metals removal. Desirably, also the minimum particle diameter of the catalyst material falls within the range of 1/20 to 1/40 inch, with the more efficacious particle diameter being in the neighborhood of 1/32 inch. The minimum particle diameter is the smallest surface to surface dimension through the center or axis of the particle, regardless of the shape of the particle. The activity of the catalyst is further enhanced, we have found, when the specific pore volume of the catalyst falls within the range of about 25 to about 40 cc. per 100 cc., and particularly in the range of about 30 cc. to about 40 cc. per 10 cc. As noted herein, good results are obtained with the more readily manufactured catalysts of lesser densities. We have also found that desulfurization selectivity of the catalyst is improved when less than about 20 percent of the pore volume of the catalyst falls within the pore distribution of 0–50 angstroms. It is noted that all determinations of pore size distribution in accordance with this invention are made by the method of nitrogen absorption.

Although the mechanism by which the desulfurization selectivity (in comparison to preferential removal of metal contaminants such as nickel and vanadium) is not fully understood, our researches point to a certain criticality factor in connection with a pore diameter range of 50–100 angstroms. The desulfurization selectivity of our novel catalyst is significantly and unexpectedly improved when at least 45 percent of the pore volume falls within the 50–100 angstrom range of pore radius. The improvement becomes even more marked when about 50 to 85 or 90 percent of the pore volume falls in the 50–100 A. range. The remainder of the pore volume desirably is in the 100–300 A. range to facilitate the transfer mechanism.

As noted previously, the increased desulfurization selectivity occurs apparently at the expense of catalyst aging characteristics. Our novel catalyst as thus far described, can also be used to advantage in applications were catalyst aging is not extremely important.

On the other hand, we have found that catalyst aging characteristic is improved when more than 30 percent of the pore volume falls within the 100–300 angstrom pore radius region. The pore size distribution in this case conforms somewhat to conventional distributions, with the exception that we prefer, as in the selective desulfurization catalyst mentioned previously, to maintain less than 20 percent of the pore volume in the 0–50 angstrom range. We also prefer to provide the metal selective catalyst (when used) with a particle size of 1/20 to 1/40 inch and more particularly in the neighborhood of about 1/32 inch with a specific pore volume of about 25 to aboue 40 cc. per 100 cc., more particularly about 30 to about 40 cc. per 100 cc.

When this catalyst of superior aging characteristic is employed in conjunction with the first-described catalyst in a bed configuration having at least two layers as likewise mentioned previously, a catalyst arrangement exhibiting both selective desulfurization and superior aging characteristic is attained, owing to the cooperation of the catalyst bed layers in the manner described below. In this case less than 45% of the total pore volume should be in the 50–100 A. radius range.

We are aware, of course, of efforts by others in this field to control catalyst pore size distribution. For example in the U.S. patent to Beuther et al. 3,383,301, several hydrodesulfurization catalysts are disclosed having the following pore size distribution:

TABLE I

| Catalyst | Pore volume, percent | | |
|---|---|---|---|
| | 0–50 A. | 50–100 A. | 100–300 A. |
| I | 27.6 | 37.9 | 39.6 |
| II | 26.5 | 51.6 | 22.2 |
| III | 25.6 | 30.3 | 44.2 |
| IV | 88.0 | 10.6 | 1.4 |
| V | 27.3 | 51.9 | 20.6 |
| VI | 55.5 | 42.5 | 1.9 |

As is evident from the preceding table, the reference does not disclose a catalyst having a pore distribution comprising both a minimum of about half of the pore volume in the pore radius range of 50–100 A. and a maximum of about 25 percent (more preferably 20 percent) in the size range of 0–50 A. In consequence, the referenced catalysts do not exhibit a selective desulfurization characteristic in the applications contemplated by our invention.

The U.S. patent to Anderson et al. No. 2,890,160 discloses catalysts for hydrodesulfurization and other contact operations such as hydrogenation, dehydrogenation, hydrocracking, hydroforming and reforming. The reference teaches improvements in the efficiency of these various contact operations with increasing pore size, ranging up to 1000 A. in diameter. The reference, however, apparently overlooks what appears to be a critical range of pore sizes, viz, pore radii in ther ange of 50–100 A. While Anderson et al. indicate the possible usage of particle sizes as small as 20 mesh (1/20 inch), they prefer larger particle sizes as " . . . the smaller particles may lead to commercially unfeasible pressure drops through the catalyst bed." There is no awareness that an undue pressure drop across the catalyst bed will affect adversely the activity thereof. The teaching of Anderson et al. in this respect, therefore, is toward larger particle sizes rather than smaller. Likewise, there is no concept of lowering the absorption rate of metallic catalyst poisons.

We overcome these and other disadvantages of the prior art with the provision of a Group VI and Group VIII catalyst as described briefly above and as elaborated upon hereinafter.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings, we have shown certain presently preferred embodiments of the invention and have illustrated certain presently preferred methods of practicing the same, wherein.

The hydrodesulfurization process of this invention employs a hydrogen partial pressure in general of 1,000 to 5,000 pounds per square inch, 1,000 to 3,000 pounds per square inch, in particular, and preferably 1,500 to 2,500 pounds per square inch. Reactor design limitations usually restrict inlet total pressures under the conditions of the present invention to not more than 2,000, 2,500, or 3,000 p.s.i.g. However, it is the partial pressure of hydrogen rather than total reactor pressure which determines hydrodesulfurization activity. Therefore, the hydrogen stream should be as free of other gases as possible. Furthermore, since reactor design limitations restrict hydrogen inlet pressures, hydrogen pressure drop in the reactor should be held as low as possible. Method and means for improving catalyst aging and mitigating pressure drops are detailed below with reference to the several figures.

The gas circulation rate can be between about 2,000 and 20,000 standard cubic feet per barrel, generally, or preferably about 3,000 to 10,000 standard cubic feed per barrel of gas preferably containing 85 percent or more of hydrogen. The mol ratio of hydrogen to oil can, therefore, be between about 8:1 and 80:1. Reactor temperatures can range between about 650 and 900° F., generally, and between about 680 and 800° F., preferably. The liquid hourly space velocity based upon atmospheric reduced crude of this invention can be between about 0.2 and 10, generally, between about 0.3 and 2.0, preferably, or between about 0.5 and 1.0 most preferably.

The improved catalyst of the invention comprises sulfided Group VI and Group VIII metals on a support such as nickel-cobalt-molybdenum or cobalt-molybdenum on alumina. Basic catalyst compositions suitable for use in the present invention are described in U.S. Pat. No. 2,880,171, and also in the aforementioned U.S. Pat. No. 3,383,301. A desirable feature of the catalyst particles of the present invention is that the smallest diameter of these particles is considerably smaller than the diameter of conventional hydrodesulfurization catalyst particles. The smallest diameter of the catalyst particles of the present invention is broadly between about $1/20$ and $1/40$ inch, preferentially between $1/25$ and $1/36$ inch, and most preferably between about $1/29$ and $1/34$ inch, as defined in a copending, coassigned application of Bradford C. White, entitled Catalytic Process Including Continuous Catalyst Injection Without Catalyst Removal, filed Mar. 6, 1970, Ser. No. 17,064. Particle sizes below the range of this application would induce a pressure drop which is too great to make them practical. Filtration and attendant encrustation would then become a serious problem.

Since the asphaltene molecules which are hydrodesulfurized in accordance with the present invention are large molecules and must enter and leave the pores of the catalyst without plugging the pores, in order to obtain good aging properties most of the pore volume of the catalyst of this invention should be in pores above 50 A. in size. Advantageously, 60 to 75 percent or more of the pore volume should be in pores of 50 A. or more, with a maximum of 20 percent in the 0–50 A. range. Most preferably, 80 to 85 percent or more of the pore volume should be in pores above 50 A. in size. Catalysts having smaller size pores have good initial activity but poor aging characteristics due to gradual plugging of the pores by metals and the asphaltene molecules.

Further in accordance with the invention, we have established an unexpected and beneficial relationship between pore size distriubtion of the catalyst and selectivity of sulfur removal or desulfurization in preference to metals removal by the catalyst. A comparatively large number of catalysts of the Groups VI and VIII metal on alumina variety have been tested under substantially identical conditions, the comparative results of which are set forth in FIGS. 1 through 7 and in the following examples. In general, it has been determined that selectivity of desulfurization increased with the percentage of total pore volume falling within the range of 50–100 A. pore radius. Significant improvement has been noted even when a minimum of about 50 percent of the pore volume falls within the 50–100 A. range. A maximum of 20 percent of the pore volume in the 0–50 A. range can be tolerated in most cases, and the maximum may rise to about 25 percent with an increasing proportion of pore volume in the 50–100 A. range. This marked improvement continues apparently in an increasing manner, up to about 80 or 85 or 90 percent of pore volume in the 50–100 A. range. From our present understanding of the invention and the molecular phenomena involved, it is apparent that significant improvement attains for catalysts having between about 50 percent and 90 percent of their pore volumes in the 50–100 A. range. The remainder of the pore volume, or a minimum or about five percent or ten percent or fifteen percent, desirably falls within the 100–300 A. radius range to provide a transfer mechanism.

An improvement in selective desulfurization in preference to metals absorption constitutes a significant advance in the art for a number of reasons. Absorption of metals by the catalyst is a particularly serious problem as most crude oils, and particularly reduced crudes containing the asphaltene fraction of the crude, contain significant quantities of metals. As the metals are almost exclusively combined in the larger molecules of the crude, the metals become increasingly concentrated in residual oils. For the most part, the same is true of sulfur-containing molecules which likewise become concentrated in reduced crudes or bottoms. Therefore, a catalyst having a greater selectivity for desulfurization in the presence of metal containing compounds becomes extremely important whenever crudes or residual petroleum fractions of any kind are being treated.

For certain applications, as where a long-lived, aging characteristic is not required, the catalyst materials according to this feature of the invention can be used alone. It has been found that the short term aging characteristics of these catalysts (FIGS. 2 and 4) are actually superior to catalysts having a more or less conventional pore size distribution. However, we have developed a composite catalyst bed structure which takes advantage of the longer-lived aging characteristic of catalysts having a more or less conventional pore size distribution, while minimizing the deposition of metals on the top or other upstream surface of the catalyst bed.

Another basis for the substantial improvement in desulfurization techniques wrought by the catalysts of the invention, with their higher degree of selectivity for sulfur removal, lies in the substantial mitigation of the catalyst bed encrustation or plugging problem. As noted previously, deposition of metals on the catalyst particles tends to fill the voids between adjacent catalyst particles (in addition to filling and deactivating the pore structure thereof). As a result, crude oils and particularly reduced crudes, which have varying amounts of entrained solid or particulate matter tend to become increasingly filtered by the catalyst bed as the metallic deposits increase. As likewise noted above, the resulting encrustation or plugging of the catalyst bed occurs at or very near the top or upstream surface thereof in a downflow operation. However, when utilizing the catalyst having the pore distribution of the invention, metals are deposited in the catalyst bed at a much slower rate such that encrustation or plugging of the bed does not occur throughout the technically useful life of this form of catalyst. This situation attains even though the catalyst having the pore distribution of the invention is provided with the range of advantageous small particle sizes described previously.

Figure 7:
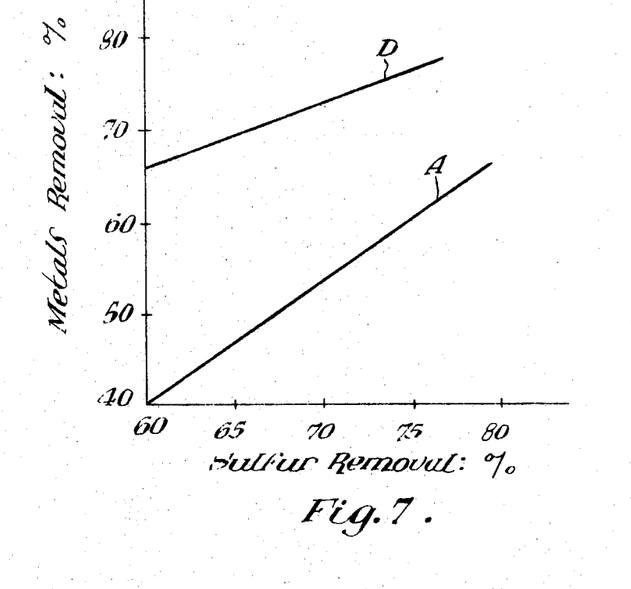
FIG. 7 is a graph of desulfurization vs. metals removal comparing a catalyst having a conventional pore size distribution with a catalyst falling within the pore size distribution of the invention.

When the catalyst having the pore distribution of the invention is employed with a catalyst having a longer lived aging characteristic as mentioned above and as described more particularly in connection with FIG. 7 of the invention the two catalysts can be arranged in series in differing beds, or as stratified layers in a single bed. For example, a lower bed or layer can comprise a catalyst having a conventional pore distribution and longer lived aging characteristic, while an upper bed or layer can comprise a catalyst having the improved pore size distribution of the invention. Our improved catalyst can comprise as much as 50 or 55 percent of the total catalyst complement.

Therefore, according to this feature of our invention, the hydrocarbon charge is fed into the top of a typical reactor to flow in series through the aforementioned beds or layers. Although our novel catalyst in an uppermost bed or layer has a greater selectivity for sulfur removal, it extracts a sufficient quantity of metals from the feed to prevent encrustation and plugging in the subsequent longer-lived but less sulfur-selective catalyst bed or layer. In fact, sufficient metals are removed by the bed of our novel catalyst that the downstream, conventional catalyst will not become subject to encrustation or plugging throughout its useful life. Thus, the full aging characteristic of the longer-lived catalyst can be employed to advantage, and moreover, is further prolonged owing to preferential extraction of sulfur in the preliminary bed or layer of our novel catalyst.

According to an additional feature of our invention, we have also found that the selectivity of the catalyst depends to a lesser extent on other factors. For example, a minor addition of a sodium compound to the alumina base of the catalyst to deposit between about 0.5 and 2 weight percent of sodium unexpectedly produces an improvement in sulfur selectivity, as likewise described below.

EXAMPLE 1

In order to investigate the influence of pore size distributions on both sulfur and metals removal capability of Groups VI and VIII metal catalysts, a number of catalysts having rather widely varying pore size distributions were tested under identical conditions. Each catalyst contained on a weight basis about 0.5 percent nickel, about 1 percent cobalt and about 8.5 percent molybdenum, the remainder being alumina. The initial inspections of these catalysts are set forth in the following table:

TABLE II

|  | Catalyst | | | | |
| --- | --- | --- | --- | --- | --- |
|  | A | B | C | D | E |
| Nominal diameter, inch | 1/32 | 1/32 | 1/32 | 1/32 | 1/32 |
| Surface area, m.²/g | 208 | 147 | 195 | 154 | 154 |
| Pore volume, cc./g | 0.523 | 0.409 | 0.604 | 0.513 | 0.511 |
| Pore size distribution, percent of pore volume: | | | | | |
| 100–300 A. radius | 14.1 | 13.7 | 33.6 | 49.3 | 48.6 |
| 50–100 A. radius | 50.1 | 66.2 | 46.3 | 32.8 | 33.8 |
| 7–50 A. radius | 35.8 | 20.1 | 20.1 | 17.9 | 19.6 |
| Specific volume of pores,ᵃ cc./100 cc | 23.0 | 26.0 | 30.9 | 35.2 | 31.6 |

ᵃ Specific volume of pores is the ratio of the volume in the 50–300 A. radius pores to the volume of the compacted catalyst.

From the foregoing Table II, it will be seen that catalysts D and E have more or less conventional pore size distributions while catalysts A and B fall clearly within the range of improved pore size distributions, i.e. 50 percent or more of the pore volume in pores of 50–100 A. radius. Catalyst C has very close to the minimum percentage pore volume falling in the 50–100 A. range, in accord with the invention. It is noteworthy also that catalyst C exhibits an intermediate specific pore volume.

The aforementioned catalysts were tested under identical conditions which are programmed in the following table:

TABLE III

Operating charge: 67 percent Kuwait, 33 percent Khafji atmospheric tower bottoms Operating conditions:
Total pressure, p.s.i.g. __________________ 2150
Charge gas, s.c.f./bbl. (85% H₂) __________ 6000
Hydrogen partial pressure: p.s.i.a. ________ 1825
Temperature, ° F. _______________________ ¹760°
Space velocity, vol./hr./vol. _____________ 3.0
Duration of run, days _______________________ 23
Feed inspections:
Gravity, ° API __________________________ 14.3
Sulfur, wt. percent _____________________ 4.29
Vanadium, p.p.m. _______________________ 76
Nickel, p.p.m. __________________________ 24
Iron, p.p.m. ____________________________ 4.7

¹ 715° F. for the first two days.

Each catalyst was sulfided in an identical manner prior to introduction of the operating charge, blended from Kuwait and Khafji residua, which contained a substantial complement of sulfur and metals particularly vanadium, nickel and iron.

The several catalysts were subjected to runs varying between 19 and 23 days as set forth in the following table:

TABLE IV

| Portion of catalyst bedᵃ | Catalyst Aᵇ | Catalyst B | | | Catalyst C | | | Catalyst D | | | Catalyst E | | |
| --- | --- | --- | --- | --- | --- | --- | --- | --- | --- | --- | --- | --- | --- |
|  |  | Top | Mid. | Btm. | Top | Mid. | Btm. | Top | Mid. | Btm. | Top | Mid. | Btm. |
| Carbon, wt. percent | 13.96 | 9.40 | 10.26 | 11.86 | 14.04 | 15.04 | 17.78 | 15.67 | 13.41 | 13.14 | 14.32 | 15.07 | 15.19 |
| Sulfur, wt. percent | 9.99 | 10.21 | 9.69 | 7.63 | 12.84 | 10.33 | 7.51 | 9.51 | 8.24 | 6.38 | 10.76 | 8.22 | 6.37 |
| Nickel, wt. percent | 1.4 | 1.8 | 1.6 | 1.2 | 2.4 | 2.2 | 1.5 | 2.3 | 2.1 | 1.5 | 2.2 | 1.9 | 1.4 |
| Vanadium, wt. percent | 5.0 | 8.5 | 6.7 | 4.3 | 11.7 | 10.6 | 6.7 | 12.0 | 10.7 | 5.5 | 11.0 | 9.0 | 5.2 |
| Catalyst age, days | 23 | 22 | 22 | 22 | 22 | 22 | 22 | 23 | 23 | 23 | 19 | 19 | 19 |

ᵃ Top is 0–15% of bed; Middle is 15–50% of bed; Bottom is 50–100 % of bed.
ᵇ Catalyst discharged in one portion.

Figure 1:
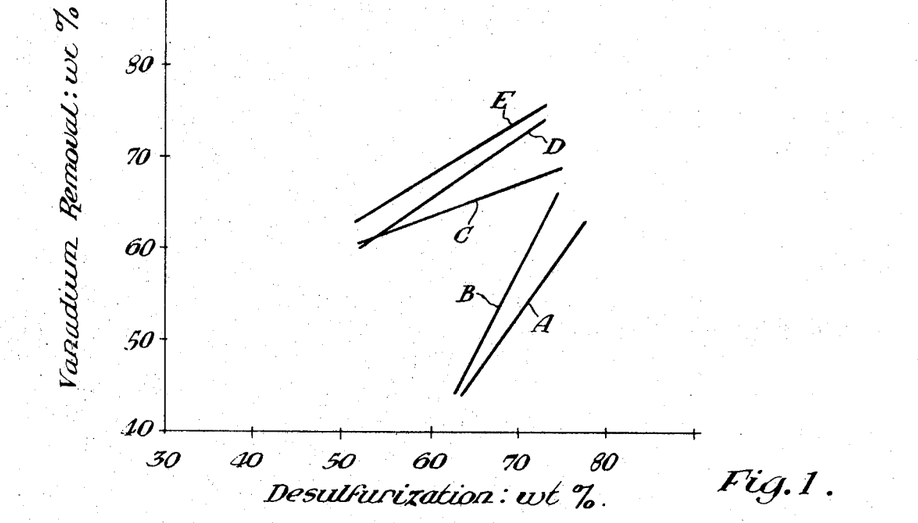
FIG. 1 is a graph of desulfurization vs. vanadium removal for the purpose of comparing a number of catalysts having differing novel pore size distributions with catalysts having conventional pore size distributions.

The preceding Table IV shows the marked lack of selectivity of catalysts A and B to metals removal and also to carbon absorption or coking. Catalysts D and E have pore size distributions (as set forth in Table I of this example) within a more or less conventional range. The results of the test are set forth graphically in FIG. 1. Curves A, B, C, D, and E correspond respectively to catalysts A, B, C, D, and E of the preceding tables. FIG. 1 clearly shows a marked and unexpected improvement in sulfur selectivity for catalysts A and B having about 50 and about 66 percent respectively of their pore volumes in the 50–100 A. range. Some improvement also is evinced by catalyst C having about 46 percent of its pore volume in the 50–100 A. range.

Figure 2:
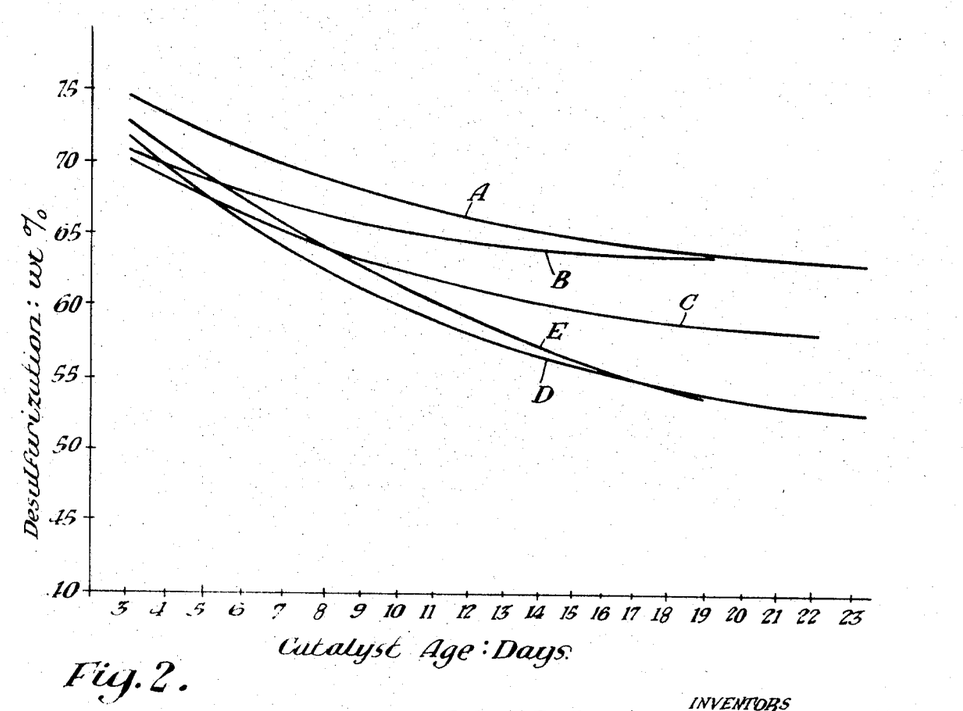
FIG. 2 is a graph of catalyst age vs. desulfurization for the catalysts of the preceding figure.

FIG. 2 illustrates the improved short term aging characteristics of the catalysts A, B and C of the invention in comparison with the conventional catalysts D and E. In FIG. 2, curves A–E correspond to catalysts A–E of the preceding Tables II and IV. FIG. 2 presents the decreasing desulfurization activity of each catalyst A, B, C, D, or E with increasing catalyst age. Until about the eighteenth or nineteenth day of the test, catalyst A exhibited superior desulfurization in comparison with the balance of the catalysts. At this time, the lesser slope of the aging curve B of the catalyst B evinces a longer-lived characteristic and superior performance. After five and eight days respectively, the improved catalysts B and C surpassed the aging characteristics of the control catalysts D and E. A significant improvement in aging was evidenced by catalyst C while marked improvements where shown by catalysts A and B in comparison with the control catalysts D and E. Catalyst B, however, lost only about 10 percent of its initial desulfurization capacity over a 21 day period while the other improved catalysts A and C each lost about 17 percent. In contrast, the control catalysts D and E each lost about 26 percent over the same 21 day period.

EXAMPLE 2

A separate group of catalysts were tested in a similar manner. Catalysts F, G and I have pore distributions falling within the range contemplated by the invention, while catalysts H and J have pore distributions falling outside of the range of the invention. Catalysts F through J are Groups VI and VIII metals on an alumina base. Each catalyst contained on a weight basis about 0.5 percent nickel, about 1 percent cobalt and about 8.5 percent molybdenum, the remainder being alumina. Catalyst F has one percent sodium added.

The initial inspections of the catalysts F through J are given in the following table:

TABLE V

|  | Catalyst | | | | |
| --- | --- | --- | --- | --- | --- |
|  | F | G | H | I | J |
| Nominal size, inch | 1/32 | 1/32 | 1/32 | 1/32 | 1/32 |
| Surface area, m.²/g | 194.4 | 123.5 | 249 | 122.9 | 146.9 |
| Pore volume, cc./g | 0.52 | 0.38 | 0.49 | 0.42 | 0.47 |
| Pore size distribution, percent of pore volume: | | | | | |
| 200–300 A. radius | 2.6 | 1.9 | 2.2 | 2.8 | 4.0 |
| 100–200 A. radius | 11.5 | 11.3 | 8.9 | 21.1 | 36.2 |
| 50–100 A. radius | 50.1 | 70.3 | 36.4 | 64.6 | 37.9 |
| 7–50 A. radius | 35.8 | 16.5 | 52.5 | 11.5 | 21.9 |
| Specific volume of pores, cc./100 cc | 23.0 | 25.4 | 15.3 | 28.0 | 28.0 |

The testing program was identical to that of the preceding Example 1, except as indicated in the following table. Catalysts F through J were tested variously over periods of 10 to 26 days, and their inspections at the end of this period are as follows:

aging characteristics relative to the control catalysts H and J and the catalysts of the invention F and G.

Figure 3:
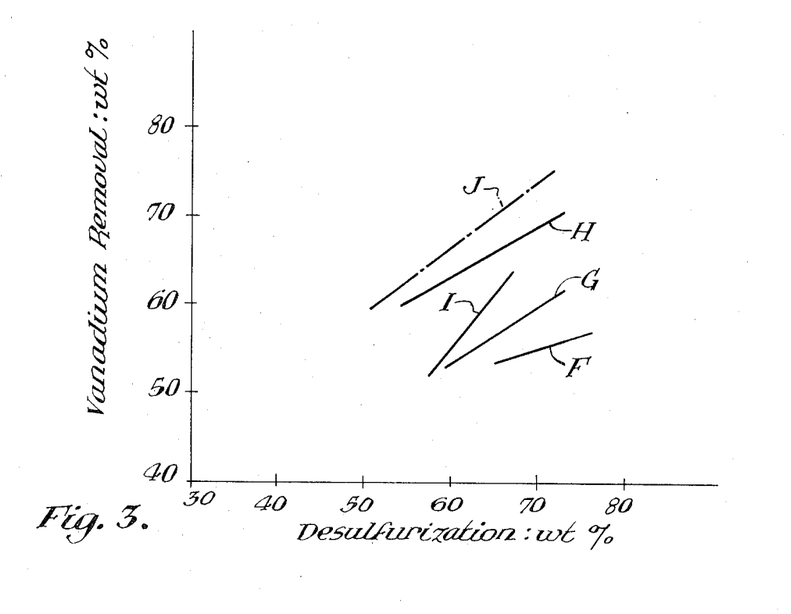
FIG. 3 is a graph of desulfurization vs. vanadium removal of another group of catalysts having differing pore size distributions.
Figure 4:
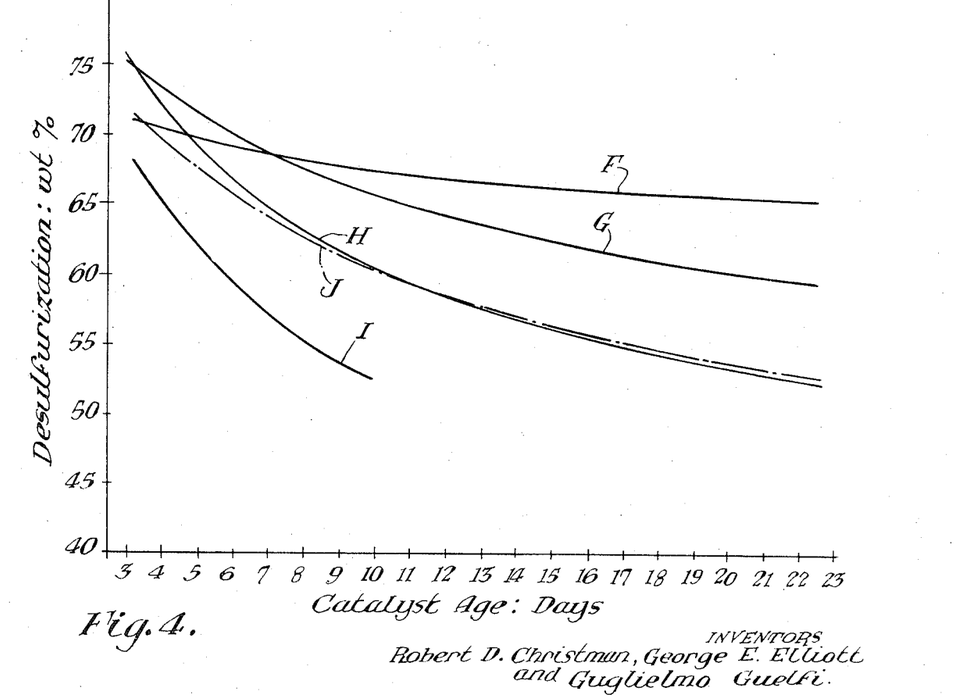
FIG. 4 is a graph of catalyst aging vs. desulfurization for the catalysts of the preceding figure.

FIG. 4 represents the decrement in desulfurization activity of each of the catalysts F through J with increasing age. The sodium treated catalyst F exhibited a superior aging characteristic relative to the remaining catalysts of this example. However, the sodium addition yielded a catalyst which is somewhat less active, initially, than the catalyst A of the preceding example, which is identical to catalyst F save for the sodium addition (see FIGS. 1 and 3). Catalyst F lost only 7 percent of its initial activity, while catalyst G of the invention, which exhibited an intermediate aging characteristic relative to catalyst F of the invention and the control catalysts H and J, lost 21.5 percent of its initial activity. On the other hand, the control catalyst J having initially a lower sulfur selectivity lost 26 percent over the same 23 day period. The percentage loss of the other control catalyst H was even greater. After the twelfth day, the two control catalysts J and H aged similarly. The initial activity loss of the catalyst H verifies that the presence of a large amount of very small pores (0–50 A.) is not desirable for residual oil hydrodesulfurization catalysts.

Examples 1 and 2 indicate that catalysts having a minimum pore volume of a 45 or 50 percent in the 50–100 A. range exhibit a superior sulfur selectivity and a superior aging characteristic over the test period indicated.

EXAMPLE 3

An extended aging test was conducted with a control catalyst L similar to catalyst D of Example 1 and a catalyst K according to the invention similar to catalyst G

TABLE VI

| Portion of catalyst bed[a] | Catalyst F | | | Catalyst G | | | Catalyst H | | | Catalyst I | | | Catalyst J | | |
| --- | --- | --- | --- | --- | --- | --- | --- | --- | --- | --- | --- | --- | --- | --- | --- |
|  | Top | Mid | Btm. | Top | Mid | Btm. | Top | Mid | Btm. | Top | Mid. | Btm. | Top | Mid. | Btm |
| Carbon, wt. percent | 13.93 | 12.82 | 16.85 | 10.64 | 13.46 | 13.46 | 16.11 | 16.28 | 18.05 | 15.11 | 14.78 | 15.60 | 15.67 | 13.41 | 13.14 |
| Sulfur, wt. percent | 10.67 | 10.52 | 7.86 | 10.41 | 9.18 | 6.60 | 9.81 | 8.75 | 7.33 | 5.98 | 5.70 | 5.44 | 9.51 | 8.24 | 6.36 |
| Nickel, wt percent | 1.20 | 1.44 | 10.7 | 1.64 | 1.31 | 1.30 | 1.88 | 1.90 | 1.66 | 1.20 | 1.10 | 0.90 | 2.30 | 2.10 | 1.50 |
| Vanadium, wt percent | 5.38 | 5.40 | 3.35 | 7.00 | 5.20 | 3.95 | 10.10 | 9.80 | 7.20 | 6.10 | 4.40 | 3.20 | 12.00 | 10.70 | 5.50 |
| Catalyst age, days | 23 | 23 | 23 | 23 | 23 | 23 | [b]26 | [b]26 | [b]26 | 10 | 10 | 10 | 23 | 23 | 23 |

[a] Top is 0–15% of bed; Middle is 15–50% of bed; Bottom is 50–100% of bed.
[b] For the last three days, a new blend of reduced crude was charged, with inspections similar to that of Example No. 1.

In FIG. 3, some of the data from the final inspections table of this example are substantiated by desulfurization vs. vanadium removal curves based on liquid product analyses. Vanadium and nickel will, of course, severely deactivate the catalysts described herein. Curves I, G and F, corresponding to catalysts I, G and F of this example and falling within the pore distribution range contemplated by our invention, show a significant improvement in sulfur selectivity in comparison to catalysts H and J falling outside of the inventive pore distribution range. Catalyst H has about the same pore volume percentage in the 50–100 A. range as catalyst J, although the smaller pore sizes (0–50 A.) predominate over the larger pore sizes (above 100 A.). Nothwithstanding, the performance of the catalysts H and J are inferior during the life test as shown in FIG. 4.

On the other hand, the catalysts F and G, having the pore distribution falling within the range of the invention, show marked improvement in sulfur selectivity as shown by curves F and G in FIG. 3. Catalyst F is very similar to catalyst A of Example 1 with the exception that catalyst F has one percent sodium added. This addition improves still further the sulfur selectivity and catalyst aging characteristics of our novel catalysts. Catalyst I shows intermediate improvement in sulfur selectivity and of Example 2. The inspections of the fresh catalysts are given in the following table:

TABLE VII

|  | Catalyst | |
| --- | --- | --- |
|  | K | L |
| Average extrudate length, inch | 0.140 | 0.11 |
| Average diameter, inch | 0.030 | 0.028 |
| Compacted density: g./cc | 0.798 | 0.765 |
| Surface area: m.²/g | 124 | 154 |
| Pore volume: cc./g | 0.38 | 0.56 |
| Pore size distribution, percent of pore volume: | | |
| 200–300 A. radius | 1.9 | 4.0 |
| 100–200 A. radius | 11.3 | 45.3 |
| 50–100 A. radius | 70.2 | 32.8 |
| 40–50 A. radius | 6.7 | 6.1 |
| 30–40 A. radius | 5.9 | 6.6 |
| <30 A. radius | 4.0 | 5.3 |
| Specific volume of pores, cc./100 cc | 25.4 | 35.2 |

Figure 5:
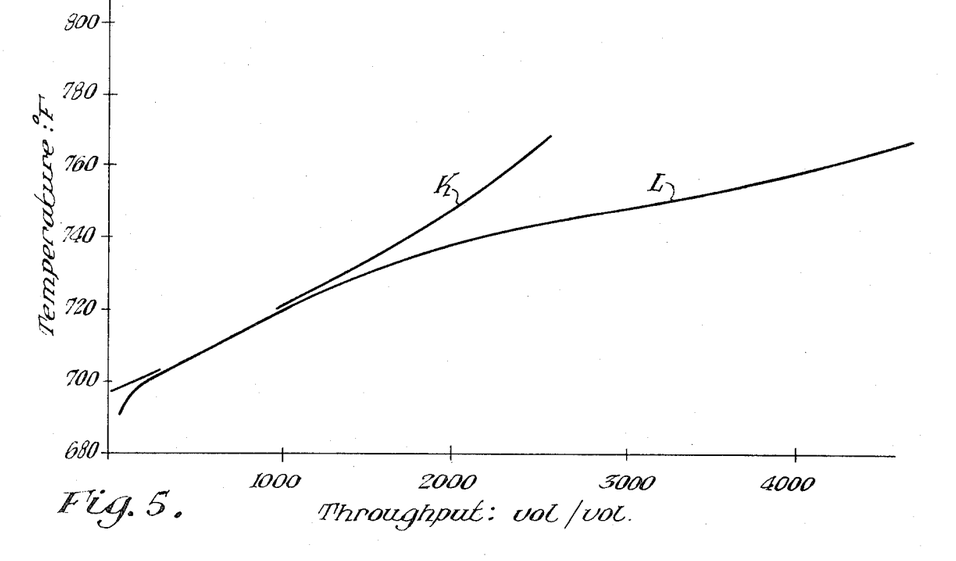
FIG. 5 is a graph of throughput for extended catalyst aging vs. desulfurization temperature comparing the conventional catalyst of the preceding figure with a catalyst falling within the pore size distribution of the invention.

In FIG. 5, the throughput is plotted against reaction temperature in degrees Fahrenheit, for constant desulfurization.

The tests were conducted under identical conditions utilizing a Kuwait atmospheric residue feed.

As evident from FIG. 5, the catalyst K of the invention exhibits an inferior long range aging characteristic in comparison to the control catalyst L. Although the initial aging characteristic of the catalyst K is equivalent to that of the catalyst L, the reaction temperature of the catalyst K began to rise unduly after about four months of the aging test. In contrast, the control catalyst L did not reach the same temperature until after seven months. Nevertheless, the aging characteristics of the catalyst K and L were very similar up until about three months. Moreover, as explained below in connection with FIG. 7, the superior sulfur selectivity of the catalyst K of the invention outweighs its somewhat inferior aging characteristic, in certain applications or operating conditions.

EXAMPLE 4

Another extended life test was run to compare the control catalyst L of the preceding example with another catalyst M of the invention. Catalyst M is similar to catalyst A of Example 1 with the exception that the pore volume percentages between 0-50 A. and 100-300 A. are substantially reversed. The initial inspections of the catalysts M and L are as follows:

TABLE VIII

| Catalyst description | Cat. M | Cat. L |
|---|---|---|
| Inspections: | | |
| Average extrudate length, inch | 0.158 | 0.111 |
| Average diameter, inch | 0.035 | 0.028 |
| Compacted density, g./cc | 0.675 | 0.765 |
| Surface area, m.²/g | 156 | 154 |
| Pore volume, cc./g | 0.52 | 0.56 |
| Pore size distribution, percent of pore volume: | | |
| 200-300 A. radius | 3.7 | 4.0 |
| 100-200 A. radius | 25.8 | 45.3 |
| 50-100 A. radius | 55.6 | 32.8 |
| 40-50 A. radius | 6.7 | 6.1 |
| 30-40 A. radius | 5.1 | 6.6 |
| <30 A. radius | 2.9 | 5.3 |
| Specific volume of pores, cc./100 cc | 29.9 | 35.2 |

The charge stock was Kuwait atmospheric bottoms. Two batches differing slightly in degree of reduction were utilized. The operating conditions were typical for this type of feed and were identical for the two tests.

Figure 6:
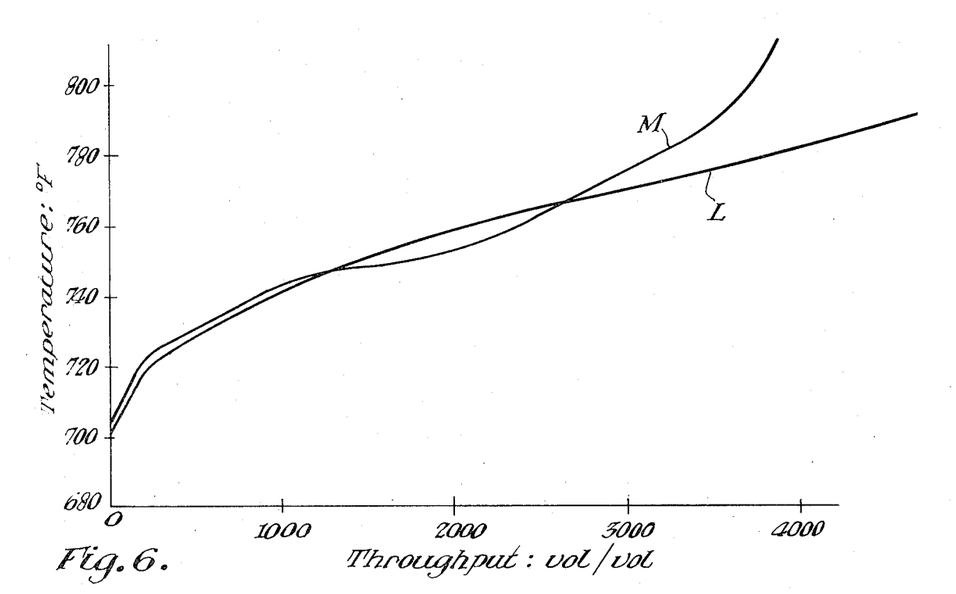
FIG. 6 is a similar graph comparing the conventional catalyst of FIG. 5 with still another catalyst falling within the pore size distribution of the invention.

The aging characteristics of the catalyst M of the invention and the control catalyst L are compared in FIG. 6. Appropriate corrections have been made for changes in feed which occurred during both runs. The temperature requirements of the catalyst M of the invention and of the control catalyst L were approximately equal for the first five months of the aging test. However, at the end of about six months the reaction temperature of the novel catalyst M began to rise rather steeply. The control catalyst L had a better aging characteristic.

This example supports the preceding example in that the lesser long-term aging characteristic of the sulfur selective catalysts of the invention renders them primarily useful in short term applications or in the composite catalyst arrangements noted previously.

The following Table IX gives the used catalyst inspections of the disclosed catalyst M at various levels throughout the catalyst bed. The inspections are normal except for the unexpectedly even distribution of the vanadium. Our previous researches indicated that the vanadium concentration gradient should have been reduced, but the near absence of a gradient in the preceding table indicates that the catalyst M was loaded most desirably and uniformly throughout most of the bed. The top four percent (4%) of the catalyst M was removed during the test after about 100 days of operation for chemical analyses. We would expect that otherwise the top 4% would have accumulated slightly more metals. Based on Example 4 it appears that the maximum loading of vanadium on the catalyst M is about 22-23% based on fresh sulfided catalyst. This compares favorably with the catalyst K of the invention in the preceding example which exhibited maximum loading of about 16% vanadium. However, the control catalyst L exceeded the capacity for vanadium deposition of the disclosed catalyst M of the invention by about 40-50%.

TABLE IX

[Chemical analysis of catalyst bed—weight percent of fresh, sulfided catalyst M]

| | Top 4% | 4-20% | 20-50% | Btm. 50% |
|---|---|---|---|---|
| Carbon | 14.2 | 12.6 | 13.0 | 14.6 |
| Sulfur | 29.4 | 28.7 | 24.5 | 17.6 |
| Vanadium | 21.9 | 22.7 | 20.7 | 17.8 |
| Nickel | 4.6 | 5.7 | 4.6 | 4.4 |

The compelling advantages of the catalysts of the invention will now be enumerated with reference to FIG. 7, showing a more direct comparison between catalyst A and D of Example 1. The curve A of FIG. 7 is similar to curve A of FIG. 1 but is extrapolated at its lower end, while curve D of FIG. 7 is similar to curve D of FIG. 1 but extrapolated somewhat at its upper end. Catalyst A, which corresponds to curve A of FIG. 7, has the pore distribution set forth in Example 1. Similarly the control catalyst D has the pore distribution set forth in Example 1.

FIG. 7 shows that at 75 percent desulfurization, for example, the control catalyst D removes more metals than the catalyst A of the invention. Therefore, if the catalysts A and D possessed equal tolerance for metals deposition, catalyst A obviously would have a superior aging characteristic as compared to catalyst D. In actuality, the control catalyst D has been found to have a greater tolerance for metals deposition before its deactivation and, therefore, ages slightly longer. On the basis of the data discussed thus far in connection with FIG. 7, it would appear that the control catalyst D is superior on the basis of its larger percentage of pore volume in the pore size range of 50-300 A. However, this is not the case in certain applications of the invention, as noted above.

FIG. 7 also shows that the selectivity advantage for the disclosed catalyst A increases significantly as the desulfurization level is reduced. Thus, in those applications in which the sulfur selectivity advantage exceeds the difference in metals tolerance, catalyst A obviously is superior. An obvious application is one in which the required level of desulfurization is relatively low, as when the sulfur content of the charge initially is comparatively low.

For example, if our novel catalyst A is charged to the top half of a catalyst bed when the overall desulfurization is 75 percent, the catalyst A then removes 60 percent of the sulfur and 40 percent of the metals. In the same application the control catalyst D would remove 60 percent of the sulfur but more than 65 percent of the metals. This increased metals removal far exceeds the superior metals tolerance of the control catalyst D.

Thus, it is advantageous to provide the compact catalyst bed with a composite catalyst structure, wherein the top or otherwise upstream layer of the bed comprises the catalyst of the invention such as the catalyst A or equivalent and a lower or downstream layer of the bed comprises the control catalyst D or equivalent. In this case, of course, the hydrocarbon charge contacts the improved catalyst initially from the inception of the reaction, and the catalyst A or equivalent causes postponement of encrustation at the upstream face of the catalyst bed, owing to the lower metals holding capacity thereof.

In accordance with our invention as much as 50-55 or 60 percent of a composite catalyst bed can be composed of the catalyst A or equivalent of our invention. Preferably as little as 1 to 10 percent of the catalyst A or equivalent can be utilized at the top or upstream face of the catalyst bed to considerable advantage. This follows from the fact that catalyst bed encrustation usually occurs in the upper 1 percent of the bed and rarely exceeds a depth of about 10 percent. Such a system permits retention of nearly all of the superior aging characteristics of a bed of catalyst D or equivalent. By the term composite bed arrangement we include, of course, a number of discrete catalyst beds, among which one or more beds are composed of the novel catalyst A or equivalent of the invention and one or more of the beds are composed of conventional catalyst, such as catalyst D.

From the foregoing it will be apparent that novel and efficient forms of Selective Catalyst for Residual Desulfurization have been described herein. While we have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

We claim:

1. A process for the hydrodesulfurization of a crude oil or a reduced crude oil containing the asphaltene fraction of the crude, said process comprising passing a mixture of hydrogen and said crude oil at a hydrogen partial pressure of 1,000 to 5,000 p.s.i. and a temperature of 650 to 900° F. through a first bed of particulate hydrodesulfurization catalyst comprising Groups VI and VIII metal supported on a non-cracking alumina support, at least 50 percent of the total pore volume of said catalyst consisting of pores having radii in the 50–100 angstrom range so that sulfur selectivity thereof is increased, and a second bed of said particulate hydrodesulfurization catalyst positioned downstream of said first-mentioned bed, said second catalyst having less than 45 percent of its total pore volume consisting of pores having radii in the 50–100 angstrom range so that the aging characteristic of the combined catalyst beds is enhanced.

2. The process according to claim 1 wherein the first mentioned catalyst bed comprises between about 1% and about 60% of the total catalyst complement.

3. The process according to claim 2 wherein said first mentioned catalyst bed comprises between about 10% and about 50% of the total catalyst complement.

4. The method according to claim 1 wherein the range of said specific pore volume is 30 cc. to 40 cc. of the total pore volume per 100 cc. of said catalyst.

5. The process according to claim 1 wherein about 50 to about 90% of the total pore volume of said first bed catalyst consists of pores having radii in the 50–100 angstrom range.

6. The process according to claim 1 wherein about 5% to about 30% of the total pore volume of said first bed catalyst consists of pores having radii in the 100–300 angstrom range to facilitate the transfer mechanism in said first bed catalyst.

7. The method according to claim 1 wherein 0 to about 25% of the total pore volume of said first bed catalyst consists of pores having radii in the 7–50 angstrom range.

References Cited

UNITED STATES PATENTS

| | | | |
|---|---|---|---|
| 3,607,000 | 9/1971 | Beal et al. | 208—216 |
| 3,594,312 | 7/1971 | Christman et al. | 208—216 |
| 3,322,666 | 5/1967 | Beuther et al. | 208—216 |
| 3,393,148 | 7/1968 | Bertolacini et al. | 208—216 |
| 3,340,180 | 9/1967 | Beuther et al. | 208—216 |

DELBERT E. GANTZ, Primary Examiner

G. J. CRASANAKIS, Assistant Examiner

UNITED STATES PATENT OFFICE
CERTIFICATE OF CORRECTION

Patent No. 3,730,879     Dated May 1, 1973

Inventor(s) R.D.Christman, G.E.Elliott and G.Guelfi

It is certified that error appears in the above-identified patent and that said Letters Patent are hereby corrected as shown below:

Column 3, line 11, "10" should be --100-- .

Column 3, line 19, "absorption" should be --adsorption-- .

Column 4, line 6, "0-50A" should be --7-50A-- .

Columns 7&8, Table IV, under "Catalyst A", "13.96" should be --13.86-- .

Column 10, line 56, under "L", "0.11" should be --0.111-- .

Column 11, line 61, "preceding" should be --proceeding-- .

Signed and sealed this 1st day of January 1974.

(SEAL)
Attest:

EDWARD M. FLETCHER, JR.
Attesting Officer

RENE D. TEGTMEYER
Acting Commissioner of Patents